United States Patent [19]
Rogers

[11] 3,948,359
[45] Apr. 6, 1976

[54] VEHICLE HYDRAULIC SHOCK ABSORBER AND INDICATING SYSTEM
[75] Inventor: Wesley A. Rogers, Grosse Pointe Park, Mich.
[73] Assignee: General Motors Corporation, Detroit, Mich.
[22] Filed: Apr. 14, 1975
[21] Appl. No.: 567,482

[52] U.S. Cl.............. 188/1 A; 73/304 C; 188/322; 317/246; 324/61 R; 340/244 C
[51] Int. Cl.²......................................... F16D 63/00
[58] Field of Search........ 188/1 A, 266, 322; 73/11, 73/304 C; 340/244 C; 317/246

[56] References Cited
UNITED STATES PATENTS
| 3,375,716 | 4/1968 | Hersch | 73/304 C |
| 3,833,094 | 9/1974 | Grossman | 188/322 X |

FOREIGN PATENTS OR APPLICATIONS
| 877,559 | 12/1953 | Germany | 188/322 |

Primary Examiner—George E. A. Halvosa
Attorney, Agent, or Firm—Howard N. Conkey

[57] ABSTRACT

A vehicle shock absorber and indicating system including a hydraulic shock absorber having two electrically conductive, relatively movable portions which are electrically insulated from one another to form a capacitor whose capacitance changes with changing levels of hydraulic fluid in the shock absorber. The two relatively movable portions are secured to the vehicle through respective electrically insulating bushings whose deterioration varies the capacitance between the two relatively movable portions when secured to the vehicle. A capacitance responsive circuit is electrically coupled to the two relatively movable portions of the hydraulic shock absorber and generates a signal representative of the condition of the vehicle shock absorber.

3 Claims, 2 Drawing Figures

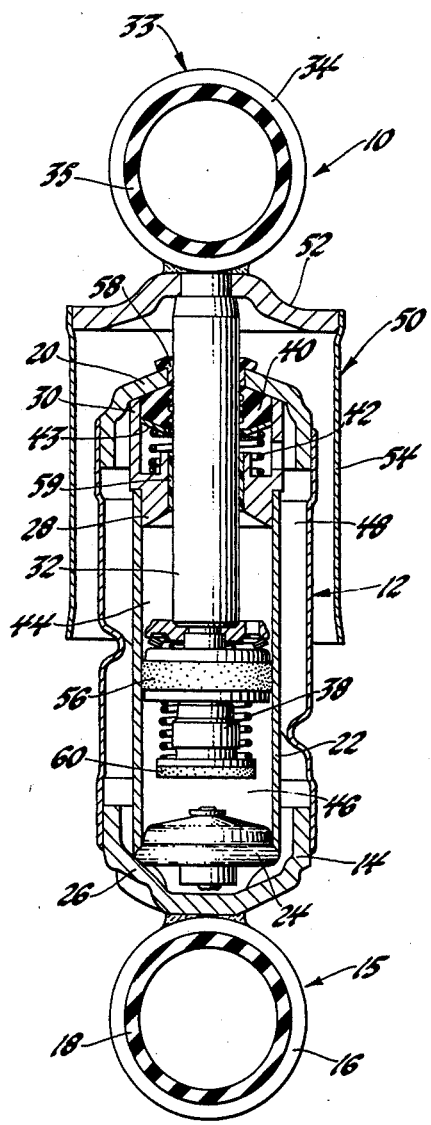
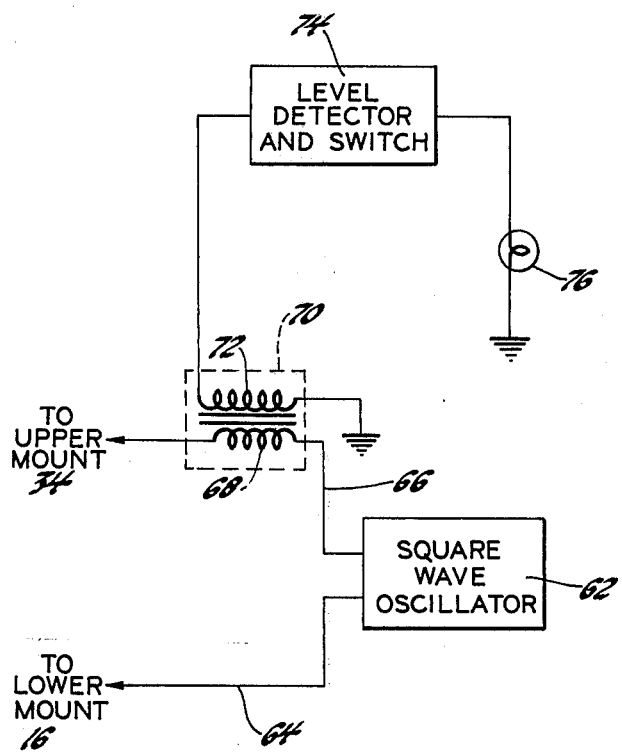
Fig. 1
Fig. 2

VEHICLE HYDRAULIC SHOCK ABSORBER AND INDICATING SYSTEM

This invention relates to a vehicle hydraulic shock absorbing apparatus and a circuit for measuring the condition thereof.

Vehicle hydraulic shock absorbers resist reciprocal movement of two relatively movable members thereof by restricting the flow of hydraulic fluid through valves in a piston which is reciprocably movable in a cylindrical tube filled with hydraulic fluid. The performance of the hydraulic shock absorber is degraded by loss of the hydraulic fluid therein. Because the hydraulic fluid is enclosed, it is difficult to determine the condition of the shock absorber as established by the hydraulic fluid level therein. Usually the condition of the shock absorber is determined subjectively by the vehicle operator.

One known method for providing a more positive indication of the condition of a vehicle shock absorber includes the provision of a mechanical switching device which is actuated when the shock absorber telescopes beyond its normal operating range. The switch is connected to an alarm which is energized to provide an indication of the state of the vehicle shock absorber.

It is the general object of this invention to provide an improved vehicle hydraulic shock absorbing and indicating system.

It is another object of this invention to provide a vehicle hydraulic shock absorbing and indicating system wherein the condition of the shock absorber is electronically monitored.

It is another object of this invention to provide a vehicle hydraulic shock absorbing and indicating system which includes a hydraulic fluid filled shock absorber which forms a capacitor having a capacitance which changes as a function of the hydraulic fluid level and a capacitance responsive circuit to provide an indication of hydraulic fluid level.

It is another object of this invention to provide a vehicle hydraulic shock absorbing and indicating system wherein the condition of the shock absorber mount bushings and hydraulic fluid level is provided by a capacitance responsive circuit.

These and other objects of this invention are provided by a hydraulic shock absorber having two relatively movable parts electrically insulated from one another to form a capacitor having a capacitance which varies as a function of the hydraulic fluid level within the shock absorber and varies as a function of the condition of the shock absorber mount bushings. A capacitance responsive circuit is coupled across the two relatively movable parts and provides a signal representative of the condition of the vehicle shock absorber.

The invention may be best understood by reference to the following description of a preferred embodiment and the drawings in which:

FIG. 1 is a vertical cross-sectional view of a shock absorber incorporating features of this invention; and FIG. 2 is a capacitance responsive circuit for providing an indication of the condition of the vehicle shock absorber of FIG. 1.

Referring to FIG. 1, there is illustrated a vehicle hydraulic shock absorber 10 which is placed between the sprung mass and the unsprung mass of a vehicle adjacent the main suspension. The shock absorber 10 includes an outer reservoir tube 12. A circular cup-shaped bottom end cap 14 securely fits within and encloses the bottom end of the reservoir tube 12. The juncture between the reservoir tube 12 and the end cap 14 is a fluid-tight fixed connection. A lower mount 15 is attached to the exterior surface of the end cap 14 and includes an electrically conducting mounting ring 16 and an electrically insulating rubber bushing 18 positioned within the mounting ring 16. The lower mount 15 is secured to the unsprung mass of the vehicle in the usual manner.

The upper end of the reservoir tube 12 is attached to an inverted cup-shaped top end cap 20 by a fluid-tight connection. Located concentrically within and in spaced relationship to the reservoir tube 12 is a smaller diameter cylindrical tube 22. A base valve 24 is held within the lower end of the cylindrical tube 22 by a plurality of projections 26 extending inwardly from the bottom end cap 14. The base valve 24 forms a closure for the lower end of the cylindrical tube 22.

An upright cup-shaped rod guide 28 encloses the upper end of the cylindrical tube 22. Upwardly extending sides 30 of the rod guide 28 are secured by the surrounding top end cap 20 to coaxially position the cylindrical tube 22 relative to the reservoir tube 12. The rod guide 28 is axially held within the end of the cylindrical tube 22 by the end cap 20.

A cylindrical piston rod 32 is concentrically located within the cylindrical tube 22 and extends through axially aligned bores within the rod guide 28 and the end cap 20. A top end of the piston rod 32 which projects through the end cap 20 is secured to an upper mount 33. The upper mount 33 includes an electrically conducting mounting ring 34 and an electrically insulating rubber bushing 35 positioned within the mounting ring 34. The upper mount 33 is secured to the unsprung mass of the vehicle in the usual manner. A valve piston 38, which is coaxially supported within the cylindrical tube 22 for sliding reciprocal movement relative thereto, is attached to the lower end of the piston rod 32. Relative movement between the spring mass and the unsprung mass of the vehicle causes the interconnected piston rod 32 and the piston 38 to reciprocate accordingly within the cylindrical tube 22. Sealing encircling the piston rod 32 and supported within the hollow interior of the cup-shaped rod guide 28 is a resilient piston rod seal 40 made of an electrically non-conducting material such as rubber. The seal 40 is biased against the piston rod 32 and the end cap 20 by a spring 42 which is compressed between a seal washer 43 which engages the base of the seal 40 and the rod guide 28. The seal 40 prevents leakage of hydraulic fluid from the shock absorber interior upon reciprocation of the piston rod 32 within the cylindrical tube 22. The seal washer 43, which is normally made of electrically conducting material, is made for use with the present invention with the aperture therein having a diameter greater than the diameter of the piston rod 32 to prevent contact therewith.

A variable volume fluid chamber 44 is formed within the cylindrical tube 22 between the rod guide 28 and the valve piston 38. A variable volume fluid chamber 46 is formed within the cylindrical tube 22 between the base valve 24 and the valve piston 38. Both fluid chambers 44 and 46 are completely filled with hydraulic fluid during normal operations of the shock absorber 10. Movement of the valved piston 38 within the cylindrical tube 22 toward the rod guide 28 decreases the volume of the fluid chamber 44. Likewise, movement of the valved piston 38 within the cylindrical tube 22 toward the base valve 24 decreases the volume of the fluid chamber 46. Suitable valving (not shown) in the valve piston 38 regulates the flow between the fluid chambers 44 and 46 caused by reciprocation of the piston 38 within the cylindrical tube 22. The regulation of hydraulic flow produces a predetermined dampening of relative movement between the sprung and unsprung mass of the associated vehicle. For a more detailed explanation of a valved piston of the type found in the preferred embodiment, reference is made to U.S. Pat. No. 2,695,034, it being understood that the details of the piston valving form no part of the present invention.

Movement of the piston 38 away from the rod guide 28 decreases the volume of the fluid chamber 46 by a greater amount than it increases the volume of the fluid chamber 44. The axial dimensions change equally in either chamber, but because the piston rod 32 occupies a substantial volume of the fluid chamber 44, it follows that upon movement of the piston rod 32 downward within the cylindrical tube 22 the decrease in the volume of the fluid chamber 46 will be greater than the increase in volume of the fluid chamber 44. Likewise, on reverse movement of the piston rod 32, the increase in the volume of the fluid chamber 46 will be greater than the decrease in the volume in the fluid chamber 44. The differential in each case equals the volume of piston rod 32 either entering or exiting the interior of the cylindrical tube 22. Because of this volumetric inequality, a supplementary quantity of hydraulic fluid must be provided to supply fluid to the fluid chamber 46 upon movement of the piston 38 upward in the cylindrical tube 22 and means must be provided to accept excess fluid from the fluid chamber 46 upon movement of the piston 38 downward within the cylindrical tube 22. A reservoir chamber 48 formed between the cylindrical tube 22 and the reservoir tube 12 performs this fluid supply function. The base valve 24, which is located between the reservoir chamber 48 and the fluid chamber 46, regulates the flow of hydraulic fluid therebetween. Components (not shown) within the base valve 24 permits hydraulic fluid from the reservoir chamber 48 to enter the fluid chamber 46 upon movement of the piston rod 32 outwardly of the cylindrical tube 22. Other components (not shown) within the base valve 24 permits hydraulic fluid from the fluid chamber 46 to flow into the reservoir chamber 48 upon movement of the piston rod 32 downwardly in the cylindrical tube 22. For a more detailed explanation of the base valve 24, reference is made to U.S. Pat. No. 2,695,034, it being understood that the details of the valving form no part of the present invention but are merely representative of one suitable valving arrangement for controlling hydraulic fluid flow between the cylindrical tube 22 and the reservoir chamber 48.

A dust cover 50 is formed by a cover plate 52 which is secured to the upper end of the piston rod 32 and a tube 54 secured to the perimeter thereof and extending downwardly over the reservoir tube 12.

The piston rod 32, piston 38, dust cover 50 and upper mount 33 constitute one portion of the shock absorber 10 and the reservoir tube 12, end caps 14 and 20, cylindrical tube 22, base valve 24, rod guide 28 and seal 40 constitute a second portion of the shock absorber 10 movable relative to the first portion. Except for the seal 40, the individual elements of each of the relatively movable portions are generally constructed from material which is electrically conductive. It has been discovered that by electrically insulating one of the movable portions of a shock absorber such as described above from the other, a capacitor is formed having a capacitance which varies progressively with changing levels of hydraulic fluid within the shock absorber and varies according to the condition of the mount bushings such as 18 and 36 when the shock absorber is mounted on a vehicle. To provide for this electrical insulation in the shock abosrber 10, the piston 38 includes a sleeve 56 comprised of electrically nonconductive material such as Teflon therearound which engages the cylindrical tube 22 so as to provide for electrical insulation between the piston 38 and the cylindrical tube 22. To prevent contact between the piston rod 32 and the seal cover 20, an electrically nonconductive gasket 58 is positioned within the opening in the seal cover 20 between the seal cover 20 and the piston rod 32 to provide for electrical insulation therebetween. Further, the rod guide 28 includes an electrically nonconducting sleeve 59 to insulate it from the piston rod 32. To prevent the electrical coupling of the piston rod 32 and the piston 38 to the end valve 24 when the shock absorber 10 is fully telescoped inwardly, an electrically nonconductive rubber insulator 60 is secured to the bottom of the piston rod 32 and piston 38 assembly to prevent electrical contact with the base valve 24. In addition, when the shock absorber 10 is mounted on the vehicle, the electrically nonconductive rubber bushings 18 and 36 maintain electrical insulation between the two relatively movable elements of the shock absorber 10 which would otherwise be electrically coupled by the vehicle.

With the aforementioned electrical insulating elements, the condition of the hydraulic shock absorber 10 can be determined by monitoring the capacitance between the two relatively movable portions thereof which form the two plates of a capacitor. This capacitance will vary as a function of the hydraulic fluid level within the fluid chambers 44 and 46 and the reservoir chamber 28 and as a function of the condition of the bushings 18 and 36. For example, it has been found that the dielectric of the capacitor formed may be approximately 2.5 when hydraulic fluid is present and 1.0 when hydraulic fluid is absent. Therefore, by measuring the capacitance between, for example, the electrically conductive lower and upper mounting rings 16 and 34 on the two relatively movable portions of the shock absorber 10, the condition of the shock absorber 10 may be determined.

Referring to FIG. 2, there is illustrated a capacitance responsive circuit for providing an indication of the condition of the vehicle hydraulic shock absorber 10 of FIG. 1. A square wave oscillator 62 has one output line 64 coupled to the lower mounting ring 16 and a second output line 66 coupled to one side of the primary winding 68 of a transformer 70. The other side of the primary winding 68 is coupled to the upper mounting ring 34. The transformer 70 includes a secondary winding 72 coupled to a level detector and switch 74 whose output is coupled to ground through an indicating lamp 76.

The frequency of the output of the square wave oscillator 62 is made equal to the tuned frequency of the circuit including the transformer 70 and the capacitor formed by the shock absorber 10 of FIG. 1 when the shock absorber 10 is filled with hydraulic fluid and the bushings 18 and 36 are in good condition. At this tuned frequency and shock absorber condition, the amplitude of the signal coupled to the secondary winding 72 of the transformer 70 is a maximum. At this level, the level detector and switch 74 is switched to an off state and the lamp 76 is extinguished. Upon loss of hydraulic fluid in the shock absorber 10 and/or deterioration of the rubber bushings 18 or 36, the capacitance of the hydraulic shock absorber changes to detune the circuit including the transformer 70. Consequently, the voltage coupled to the secondary windings 72 of the transformer 70 decreases in amplitude. When the oil level reaches a specified level and/or the rubber bushings 18 or 36 have sufficiently deteriorated, the voltage coupled to the secondary winding 72 decreases to a level whereby the level detector and switch 74 switches to an on state to energize the warning lamp 76 to provide an indication of the defective condition of the hydraulic shock absorber 10.

The circuit of FIG. 2 provides a warning when the hydraulic fluid level of the shock absorber decreases to a certain level or the bushings reach a certain deteriorated condition. It is understood that a circuit for providing an indication of the magnitude of capacitance of the capacitor formed by the shock absorber 10 may be provided for providing an indication of the instantaneous condition of the vehicle shock absorber 10. Further, although the capacitance measuring circuit of FIG. 2 employs a tuned circuit, any circuit responsive to capacitance may be employed for providing the indication of shock absorber condition.

The capacitive responsive circuit of FIG. 2 or any other capacitive responsive circuit may be permanently installed on a vehicle and coupled to the shock absorber or may be a portable unit momentarily coupled to the shock absorber to provide an "on the spot" check of the shock absorber condition. Further, the hydraulic fluid level in a shock absorber may be checked prior to installation on a vehicle by the capacitance responsive circuit.

The detailed description of the preferred embodiment of this invention for the purposes of explaining the principles thereof is not to be considered as limiting or restricting the invention since many modifications may be made by the exercise of skill in the art without departing from the scope of the invention.

I claim:

1. A vehicle hydraulic shock absorber and indicating system comprising: a hydraulic shock absorber normally filled with hydraulic fluid, said shock absorber including first and second electrically conductive relatively movable portions; means for electrically insulating the first and second relatively movable portions from one another, said electrically insulated portions comprising a capacitor having a capacitance progressively changing with changing levels of hydraulic fluid within the shock absorber; a capacitance responsive circuit electrically coupled to the first and second relatively movable portions of the shock absorber, said circuit being responsive to the capacitance of the capacitor formed by the first and second relatively movable portions for generating a signal representing the hydraulic fluid level in the shock absorber; and means responsive to the signal for indicating hydraulic fluid level within the shock absorber.

2. A vehicle hydraulic shock absorber and indicating system comprising: an electrically conductive cylindrical tube, the tube having a closure member at each end; an electrically conductive, reciprocably movable piston within the tube forming two fluid chambers therein, the fluid chambers being normally filled with hydraulic fluid; valve means carried by the piston for regulating fluid flow therethrough, an electrically conductive piston rod coupled with the piston and extending axially outward from the tube through one of the closure members, the piston and the valve means providing a resistance to relative movement between the piston rod and the tube when the fluid chambers are filled with hydraulic fluid; means for electrically insulating the piston from the tube; means for electrically insulating the piston rod from the tube, the piston and the piston rod coupled thereto and the tube comprising a capacitor having a capacitance progressively changing with changing levels of hydraulic fluid within the two fluid chambers; a capacitance responsive circuit electrically coupled to the piston rod and the tube, said circuit generating a capacitance signal representing the capacitance therebetween; and means responsive to the capacitance signal for indicating hydraulic fluid level within the two fluid chambers.

3. A vehicle hydraulic shock absorbing and indicating system for a vehicle having sprung and unsprung masses comprising: a hydraulic shock absorber, said shock absorber including an electrically conductive cylindrical tube, the tube having a closure member at each end, an electrically conductive, reciprocably movable piston within the tube forming two fluid chambers therein, the fluid chambers being normally filled with hydraulic fluid, valve means carried by the piston for regulating fluid flow therethrough, and an electrically conductive piston rod coupled with the piston and extending axially outward from the tube through one of the closure members, the piston and the valve means providing a resistance to relative movement between the piston rod and the tube when the fluid chambers are filled with hydraulic fluid; means for electrically insulating the piston from the tube; means for electrically insulating the piston rod from the tube; means coupling the tube to one of the sprung or unsprung masses of the vehicle through a first electrically insulating member; means coupling the piston rod to the other one of the sprung or unsprung masses of the vehicle through a second electrically insulating member, the piston and the piston rod coupled thereto and the tube comprising a capacitor having a capacitance progressively changing with changing levels of hydraulic fluid within the two fluid chambers and with deterioration of the first and second electrically insulating members; a capacitance responsive circuit electrically coupled to the piston rod and the tube, said circuit generating a capacitance signal representing the capacitance therebetween; and means responsive to the capacitance signal for indicating the condition of the shock absorber.

* * * * *